US012712222B2

(12) United States Patent
Partin et al.

(10) Patent No.: US 12,712,222 B2
(45) Date of Patent: Aug. 18, 2026

(54) STACKING FRAME AND COOLING SYSTEM FOR BATTERY CELLS

(71) Applicant: Viridi Parente, Inc., Buffalo, NY (US)

(72) Inventors: Phillip Partin, Grafton, MA (US); Noah S. Podolefsky, Boulder, CO (US); John Paul Vance, Amherst, NY (US); Jan-Roger Linna, Boston, MA (US)

(73) Assignee: Viridi Parente, Inc., Buffalo, NY (US)

( * ) Notice: Subject to any disclaimer, the term of this patent is extended or adjusted under 35 U.S.C. 154(b) by 934 days.

(21) Appl. No.: 17/933,966

(22) Filed: Sep. 21, 2022

(65) Prior Publication Data

US 2024/0097236 A1 Mar. 21, 2024

(51) Int. Cl.

*H01M 10/6567* (2014.01)
*H01M 10/613* (2014.01)
*H01M 50/244* (2021.01)

(52) U.S. Cl.

CPC ..... *H01M 10/6567* (2015.04); *H01M 10/613* (2015.04); *H01M 50/244* (2021.01)

(58) Field of Classification Search

CPC ................................................ H01M 10/6567
See application file for complete search history.

(56) References Cited

U.S. PATENT DOCUMENTS 7,433,794 B1 10/2008 Berdichevsky et al.
7,781,091 B2 8/2010 Matsuoka et al.
8,216,711 B2 7/2012 Kim et al.
8,460,815 B2 6/2013 Oury et al.
8,574,740 B2 11/2013 Quick et al.
8,999,557 B2 4/2015 Kim et al.
9,065,158 B2 6/2015 Martz et al.
9,385,360 B2 7/2016 Stoughton et al.
10,026,937 B2 7/2018 Kim et al.
10,249,860 B2 4/2019 Choi
10,391,873 B2 8/2019 Köhnke
10,554,048 B2 2/2020 Abdelrazek et al.
10,737,583 B2 8/2020 Johnsen et al.
11,283,273 B2 3/2022 Smith et al.
11,431,191 B2 8/2022 Heilman et al.
11,437,836 B2 9/2022 Maruno
11,444,474 B1 9/2022 Namuduri et al.
(Continued)

FOREIGN PATENT DOCUMENTS

WO WO2022004972 A1 1/2022

OTHER PUBLICATIONS

US 11,894,573 B2, 02/2024, Li et al. (withdrawn)

*Primary Examiner* — Brian R Ohara
(74) *Attorney, Agent, or Firm* — Farber LLC

(57) ABSTRACT

Provided in this disclosure is a passive internal cooling system for a battery pack. First and second stacking frames are provided, each having mating structures for engaging and retaining the first and second stacking frames to each other. Each of the first and second stacking frames are configured for substantially surrounding and enclosing a surface of a battery module for retaining one or more batteries. One or more TRS pouches are enclosed between the first and second stacking frames. The TRS pouch(es) includes a thermally cooling fluid that ruptures into the battery module from heat produced in a thermal runaway event in the battery module.

13 Claims, 11 Drawing Sheets

(56) References Cited

U.S. PATENT DOCUMENTS

| | | | | |
|---|---|---|---|---|
| 2007/0285051 | A1 | 12/2007 | Jeon et al. | |
| 2014/0154547 | A1 | 6/2014 | Anderson | |
| 2016/0254504 | A1 | 9/2016 | Kim | |
| 2018/0145294 | A1 * | 5/2018 | Choi .................. | H01M 50/293 |
| 2018/0219261 | A1 | 8/2018 | Drews et al. | |
| 2020/0227700 | A1 | 7/2020 | Thomas | |
| 2020/0335737 | A1 | 10/2020 | Hilligoss et al. | |
| 2020/0403195 | A1 | 12/2020 | Mo | |
| 2022/0140614 | A1 | 5/2022 | Ough et al. | |
| 2022/0158296 | A1 | 5/2022 | Chen et al. | |
| 2022/0289030 | A1 | 9/2022 | Pressman et al. | |
| 2022/0320877 | A1 | 10/2022 | Smith et al. | |
| 2023/0011867 | A1 | 1/2023 | Arya et al. | |
| 2023/0109116 | A1 * | 4/2023 | Park .................. | H01M 50/682<br>429/120 |
| 2023/0192017 | A1 | 6/2023 | Mitani et al. | |
| 2023/0310912 | A1 | 10/2023 | Yu et al. | |
| 2024/0017628 | A1 | 1/2024 | Woods et al. | |

* cited by examiner 10b
10a
22
20
20
10a
10b
10a
10b
C
22
20
12
20
20
22
12
20
42
42
38a
A
A
38a
44
38a
38a
44
10a
12
10b
10a
12
10b

STACKING FRAME AND COOLING SYSTEM FOR BATTERY CELLS

1. BACKGROUND

A. Technical Field

This invention pertains to the field of batteries, particularly the field of mitigating thermal runaway in lithium-ion batteries.

B. Description of Related Art

Lithium-ion batteries have proliferated in common, everyday use. Consequently, there is an increased risk associated with thermal runaway in such batteries. Thermal runaway is an uncontrollable exothermic reaction that can occur within lithium-ion batteries when damaged or short circuited, resulting in a rapid release of heat.

During thermal runaway, the battery can rapidly reach temperatures greater than 700° C. This heating breaks down the materials in the battery into a mixture of toxic and flammable gases. These gases could ignite and result in flames or explosion. Moreover, the heat released by the battery can propagate to any nearby batteries, resulting in a chain reaction. Systems including large stacks of batteries can suffer from a catastrophic cascade, resulting in considerable damage, pollution and potentially loss of life.

For at least the above reasons, there is therefore a need for a thermal mitigation system for managing and containing thermal runaway events in batteries.

There is specifically a need for a thermal mitigation system for lithium-ion battery stacks and arrays in which multiple batteries are deployed in a concentrated area.

There is also a need for a thermal mitigation system for lithium-ion batteries that can isolate thermal runaway in a single battery in a stack or array to prevent a cascade.

SUMMARY

Provided in this disclosure is a passive internal cooling system for a battery pack. First and second stacking frames are provided, each having mating structures for engaging and retaining the first and second stacking frames to each other to form a subassembly. Each of the first and second stacking frames are configured for substantially surrounding and enclosing a surface of a battery module for retaining one or more batteries. One or more thermal runaway shield ("IRS") pouches are enclosed between the first and second stacking frames. The TRS pouch(es) are coated aluminum pouches that include a thermally cooling fluid that ruptures into the battery module from heat produced in a thermal runaway event in the battery module. In one exemplary embodiment of the invention, the TRS pouches are of a type manufactured by KULR Technology Group, Inc. In one aspect of the invention, there are two TRS pouches with a spacer plate inserted therebetween. The spacer plate provides a thermal barrier between the first and second TRS pouches during the thermal runaway event in the battery module.

In another aspect of the invention, each of the first and second stacking frames includes a peripheral frame portion that sits atop a perimeter of the surface of the battery module. A plurality of pins extend inwardly toward a center of the peripheral frame portion. The plurality of pins engage and retain the TRS pouch(es) between the first and second stacking frames. The mating structures on the stacking frames include projections and alignment recesses formed on each of the stacking frames. The projections on each of the stacking frames are received within the alignment recesses of the respective other of the stacking frames. In a particular aspect, the projections and alignment recesses are formed on the same surface of each of the stacking frames.

In yet another aspect, each of the first and second stacking frames includes a peripheral groove for substantially surrounding and enclosing a perimeter of the surface of the battery module. The peripheral groove of the first stacking frame substantially surrounds and encloses a perimeter of a top surface of the battery module upon which the stacking frame rests. Similarly, the peripheral groove of the second stacking frame substantially surrounds and encloses a perimeter of a bottom surface of a second battery module stacked upon the second stacking frame. The battery module(s) can include electrical connections between the batteries and an external electrical system.

In a further aspect, a passive internal cooling system for a stack of battery packs includes a first stack and a second stack. The first stack includes a first stacking frame assembly including first and second stacking frames. Each of the first and second stacking frames of the first stacking frame assembly having mating structures for engaging and retaining the first and second stacking frames of the first stacking frame assembly to each other. The first stacking frame of the first stacking frame assembly includes a peripheral groove that substantially, surrounds and encloses a perimeter of a top surface of a first battery module upon which the first stacking frame assembly rests. The second stacking frame of the first stacking frame assembly includes a peripheral groove that substantially surrounds and encloses a perimeter of a bottom surface of a second battery module stacked upon the second stacking frame of the first stacking frame assembly. A first TRS pouch arrangement is enclosed between the first and second stacking frames of the first stacking frame assembly and includes a thermally cooling fluid that ruptures into the first battery module from heat produced in a thermal runaway event in the first battery module.

The second stack of the passive internal cooling system for a stack of battery packs includes a second stacking frame assembly including first and second stacking frames. Each of the first and second stacking frames of the second stacking frame assembly have mating structures for engaging and retaining the first and second stacking frames of the second stacking frame assembly to each other. The first stacking frame of the second stacking frame assembly includes a peripheral groove that substantially surrounds and encloses a perimeter of a top surface of the second battery module upon which the second stacking frame assembly rests. The second stacking frame of the second stacking frame assembly comprises a peripheral groove that optionally substantially surrounds and encloses a perimeter of a bottom surface of a third battery module stacked upon the second stacking frame of the second stacking frame assembly. A second TRS pouch arrangement is enclosed between the first and second stacking frames of the second stacking frame assembly. The second IRS pouch arrangement includes a thermally cooling fluid that ruptures into the second battery module from heat produced in a thermal runaway event in the second battery module.

In an additional aspect, the first and second IRS pouch arrangements each include respective first and second IRS pouches with a spacer plate inserted therebetween. The spacer plate provides a thermal barrier respectively between the first and second TRS pouches during the thermal runaway event in the respective battery module. In a further additional aspect, the system includes one or more side members connected to the second stacking frame of the first stacking frame assembly and the first stacking frame of the second stacking frame assembly. In this manner, the side member(s) spans a side of the second battery module to substantially enclose the side.

In a further additional aspect, a passive internal cooling system for a battery pack includes first and second stacking frames, each having mating structures for engaging and retaining the first and second stacking frames to each other. Each of the first and second stacking frames includes a peripheral frame portion that sits atop a perimeter of a battery module for retaining at least one battery, for substantially surrounding and enclosing a surface of the battery module. First and second IRS pouches are enclosed between the first and second stacking frames. The IRS pouch(es) includes a thermally cooling fluid that ruptures into the battery module from heat produced in a thermal runaway event in the battery module. A spacer plate is inserted between the first and second IRS pouches. The spacer plate provides a thermal barrier between the first and second IRS pouches during the thermal runaway event in the battery module. The peripheral frame portions of each of the first and second stacking frames also include a plurality of pins extending inwardly toward a center of the peripheral frame portion. The plurality of pins engage and retain the first and second IRS pouches between the first and second stacking frames.

According to an aspect of the present embodiments, a thermal mitigation system is provided for managing and containing thermal runaway events in lithium-ion batteries.

According to another aspect of the present embodiments, a thermal mitigation system for lithium-ion battery stacks and arrays is provided for protecting multiple batteries deployed in a concentrated area.

According to yet another aspect of the present embodiments, a thermal mitigation system is provided for lithium-ion batteries that can isolate thermal runaway in a single battery module in a stack or array to prevent a cascade.

Other benefits and advantages of this invention will become apparent to those skilled in the art to which it pertains upon reading and understanding of the following detailed specification.

III. Brief DESCRIPTION OF THE DRAWINGS

The disclosed passive cooling system may take physical form in certain parts and arrangement of parts, embodiments of which will be described in detail in this specification and illustrated in the accompanying drawings which form a part hereof and wherein:

FIGS. 1A and 1B are perspective views respectively showing the front and back of a stacking frame in accordance with an exemplary embodiment.

FIGS. 2A, 2B, 2C, and 2D are respective front, side-sectional, side and back views of the stacking frame in accordance with an exemplary embodiment.

FIGS. 4A and 413 are rear and detail views of the present stacking frame design showing the peripheral groove in accordance with an exemplary embodiment.

Figure 5C:
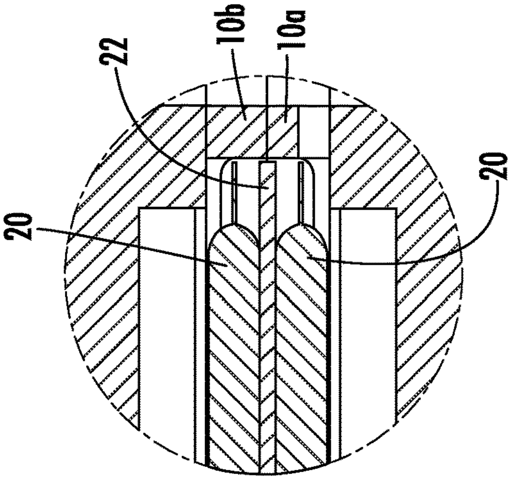
Figure 5B:
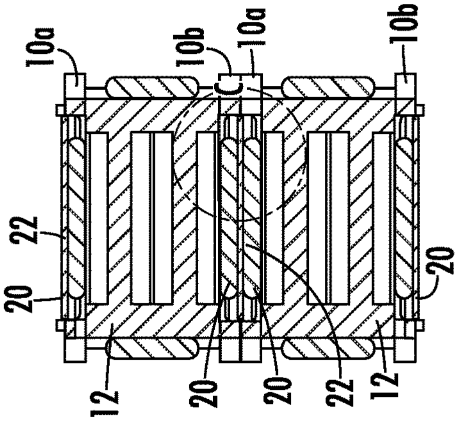
Figure 5A:
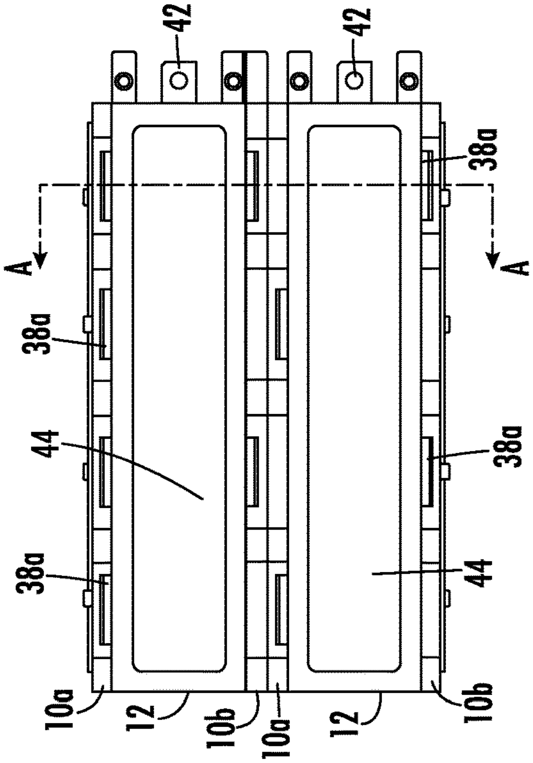

FIGS. 5A, 5B, and 5C are side, sectional and detail views of the present stacking frames deployed with a stack of two battery modules in accordance with an exemplary embodiment.

Figure 6A:
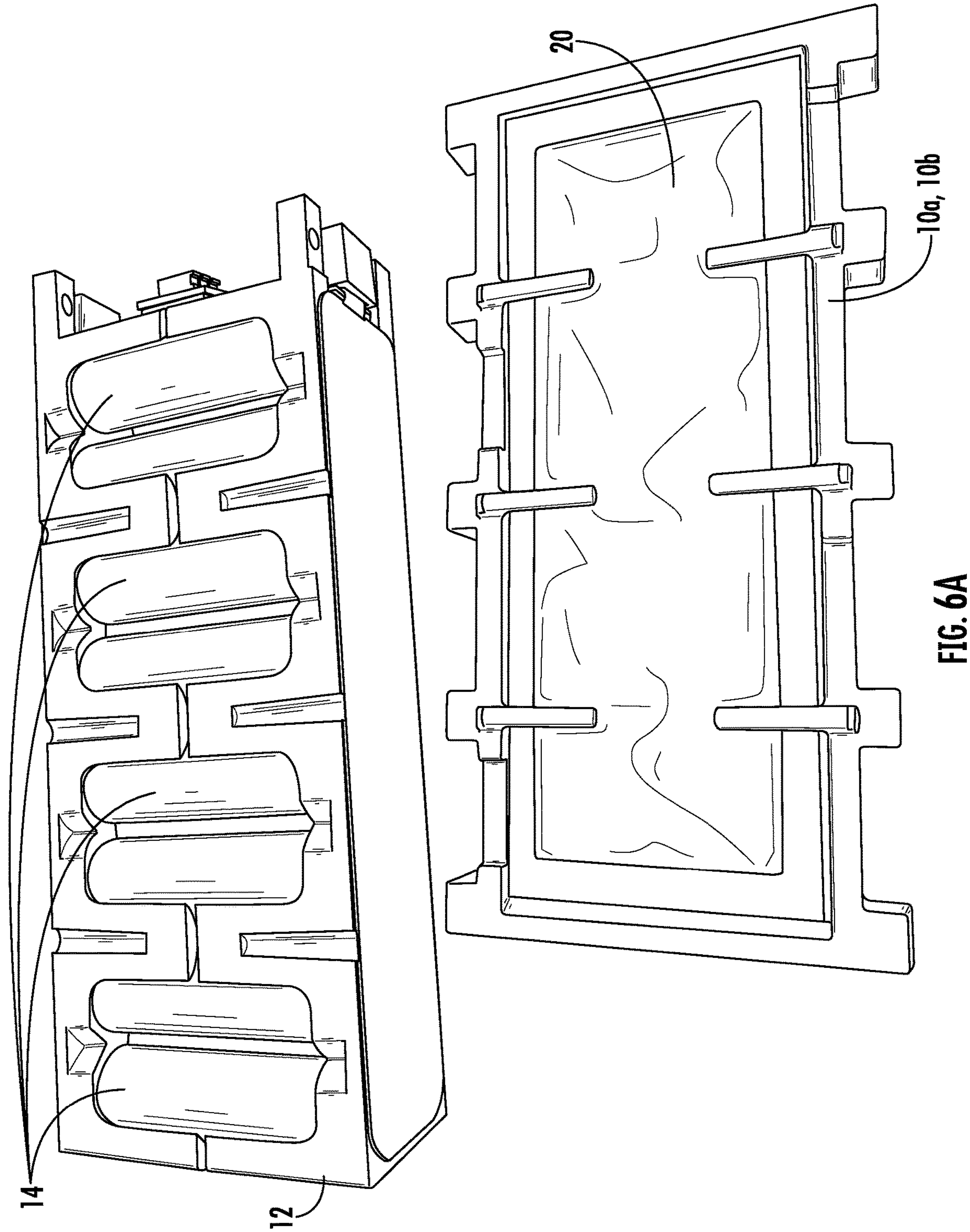
Figure 6B:
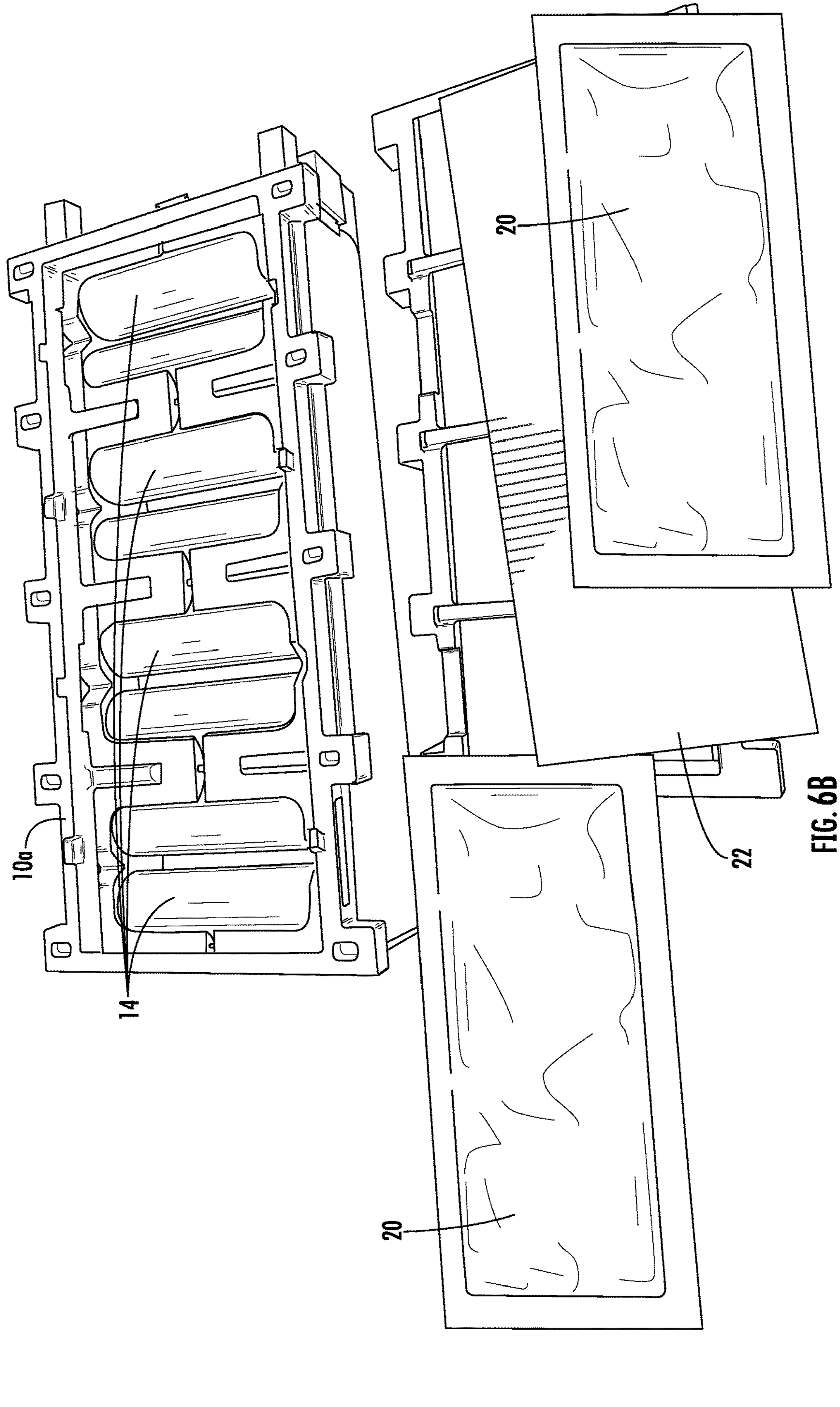
Figure 6C:
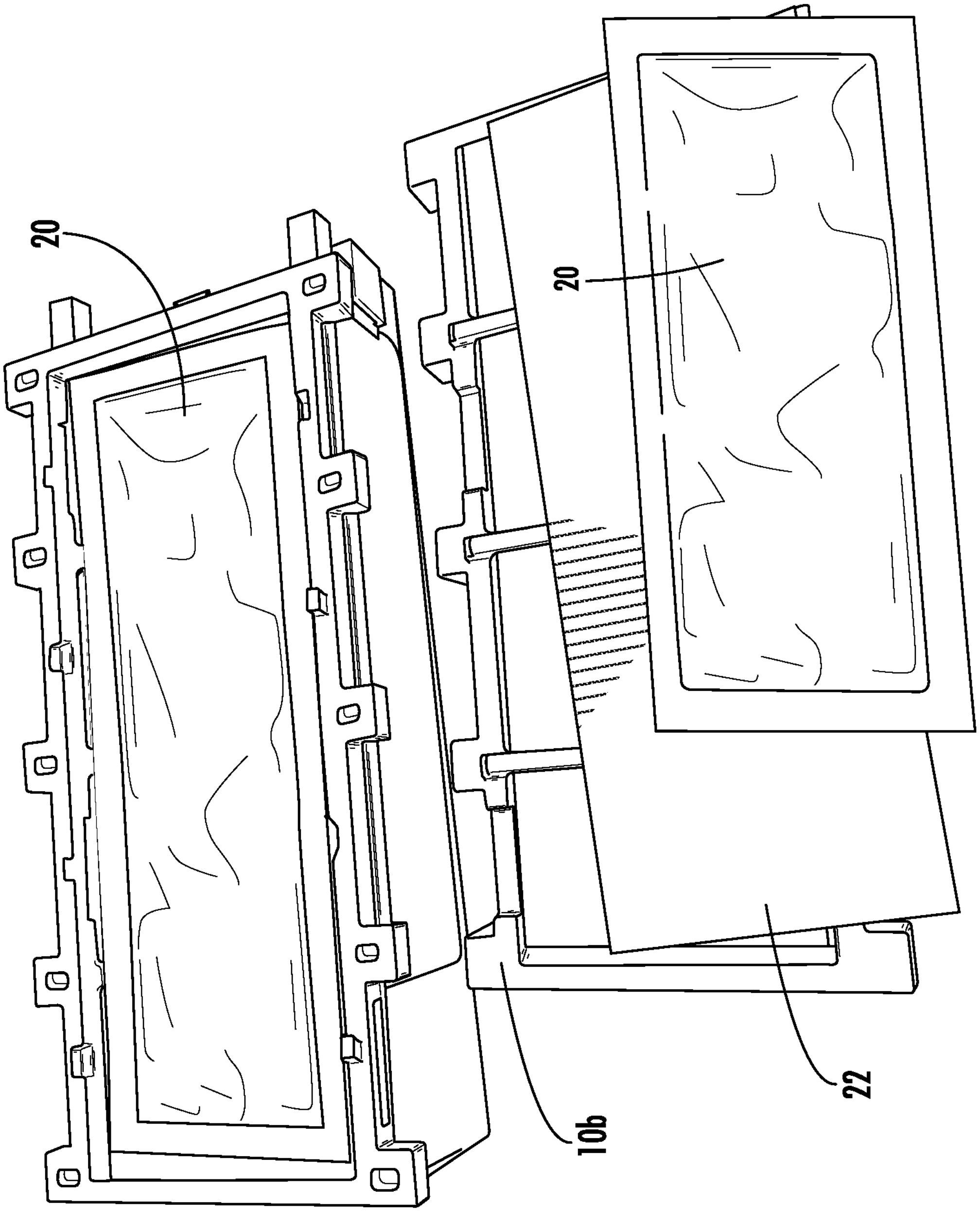
Figure 7:
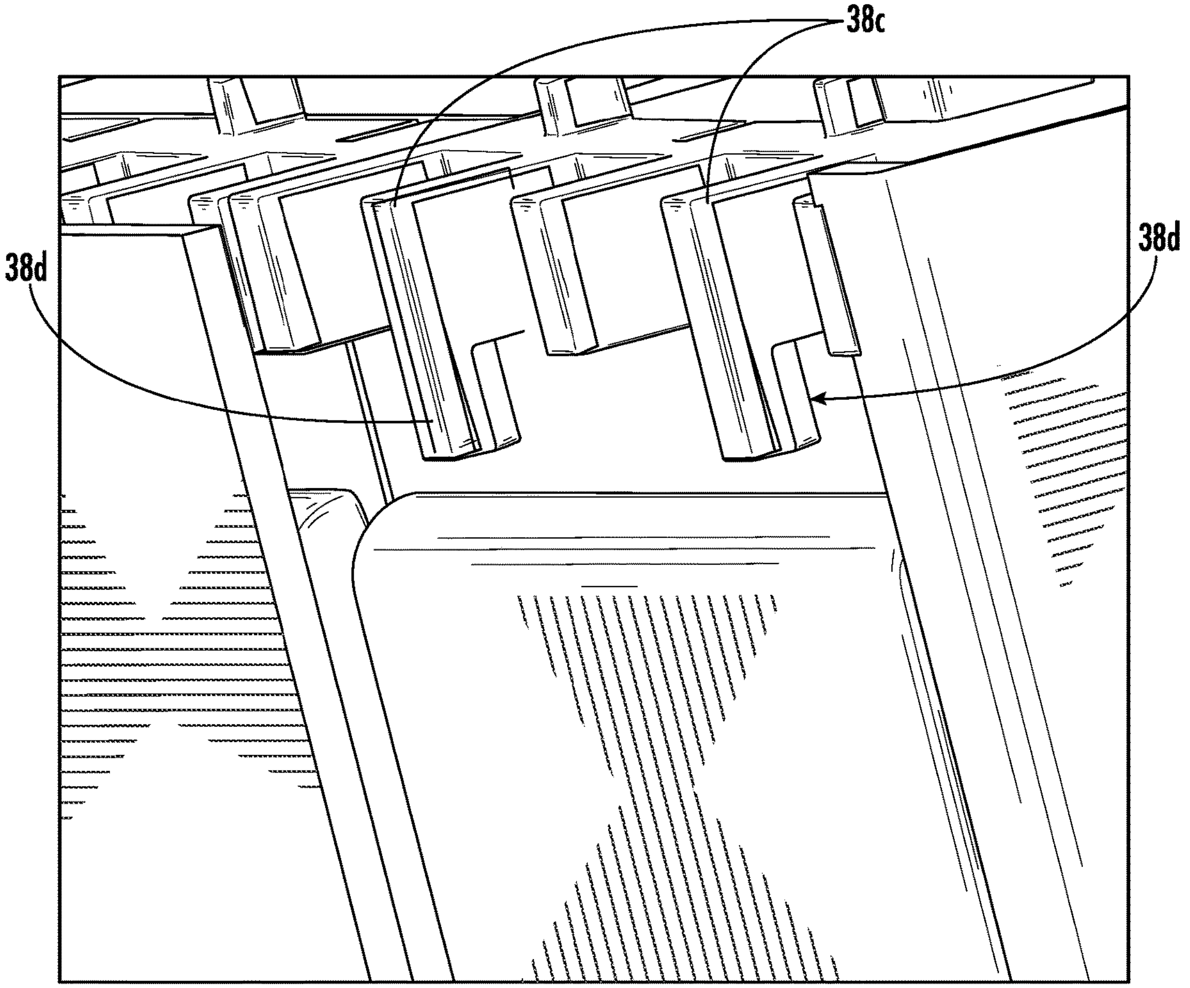

FIGS. 6A, 6B, 6C, 6I), and 6E are assembly views showing the present stacking frames and related subassembly components in various stages of assembly in accordance with an exemplary embodiment, FIG. 7 depicts optional alternate features that assist in alignment of certain components in accordance with an exemplary embodiment.

IV. DETAILED DESCRIPTION

Referring now to the drawings wherein the showings are for purposes of illustrating embodiments of the article only and not for purposes of limiting the same, and wherein like reference numerals are understood to refer to like components:

FIGS. 1A, 1B, 2A, 2B, 2C and 2D generally show a basic design for a stacking frame 10 in accordance with the present embodiments. As indicated in FIGS. 3, 5A, 5B, 5C, 6A, 6B. 6C, 6D and 6E, first and second stacking frames 10*a*, 10*b* are employed, each having mating structures for engaging and retaining the first and second stacking frames 10*a*, 10*b* to each other (as will be explained in detail hereinbelow) in order to fashion a subassembly. Each of the first and second stacking frames 10*a*, 10*b* are configured for substantially surrounding and enclosing a surface of a battery module 12 for retaining one or more batteries 14, which can be lithium-ion batteries or any other suitable type of batteries. Specifically, the battery module 12 can include 16 lithium-ion batteries.

As indicated in FIGS. 5B, 5C, 6A, 6B, 6C, 6D and 6E, one or more TRS side pouches 20 are enclosed between the first and second stacking frames 10*a*, 10*b*. The TRS side pouches 20 are composed of water-based coolant and a carbon fiber wick enclosed in a multilayer metallized sealed plastic pouch. The side pouches 20 will rupture from the heat produced in a thermal runaway event in the battery module 12 when temperatures are greater than 160 degrees C. Upon rupturing, the side pouches 20 release a thermally cooling fluid composed of a water-based coolant having known properties that safely extinguish flame and reduce heat in a lithium-ion battery. Thus, the TRS side pouches 20 are the primary protection as the cell in thermal runaway will vent into the side pouch 20 bursting and it will burst first. In this manner, the present passive cooling system is an anti-propagation system that extinguishes thermal runaway in a single battery module and thereby protects any nearby battery modules from thermal runaway thus preventing a dangerous cascade situation.

As also indicated in FIGS. 5B, 5C, 6A, 6B, 6C, 6D and 6E, the first and second IRS side pouches 20 are separated by a spacer plate 22 inserted therebetween, so that the spacer plate 22 divides and separates the TRS side pouches 20. In this manner, the spacer plate 22 provides a thermal barrier between the first and second TRS side pouches 20 during the thermal runaway event in the battery module 12. The spacer plate 22 is formed of a suitably heat resistant material such as phenolic having known properties that contain the heat. In this manner, the spacer plate 22 allows the first TRS side pouch 20 to rupture and quench the battery module 14 but protects the second TRS side pouch 20 from prematurely rupturing unless the heat in the battery module 14 is sufficiently high that the second pouch is required to extinguish the flame. Thus, the spacer plate 22 prevents transfer of heat from cell in thermal runaway to modules above or below preventing propagation.

As particularly shown in FIGS. 1A, 1B, 2A, 2B, 2C, and 2D the first and second stacking frames 10*a*, 10*b* are both formed of the same basic stacking frame 10 design. Thus, the first and second stacking frames 10*a*, 10*b* are identical and interchangeable, both having features of the same stacking frame 10 that are interoperable and interconnectable. The stacking frame 10 thus includes a peripheral frame portion 30 that is configured to sit atop a perimeter of the surface of the battery module 12. As shown, the peripheral frame portion 30 is generally rectangular and is defined by a solid frame having a first frame member 30*a* parallel and opposite to an identical second frame member 30*b*, both of which are perpendicular to third and fourth frame members 30*c*, 30*d* which respectively parallel and identical to each other. The peripheral frame portion 30 is generally open or void in a central area within the periphery of the frame structure.

With continued reference to FIGS. 1A, 1B, 2A, 2B, 2C, and 2D, the peripheral frame portion 30 includes a plurality of transverse locating pins 32 extending inwardly toward a center of the peripheral frame portion 30. The plurality of transverse locating pins 32 engages and retains the TRS pouch(es) 20 between the first and second stacking frames 10*a*, 10*b* and serve as pouch holders when assembled as shown in FIGS. 5B, 5C, 6A, 6B, 6C, 6D and 6E. As depicted, the transverse locating pins 32 are formed on each of the first and second frame members 30*a*, 30*b* so that opposite pins 32 generally face each other and are aligned with each other. As shown, the peripheral frame portion 30 includes six pins, three pairs of opposing pins. However, it is to be appreciated that any suitable number and orientation of transverse locating pins 32 could be contemplated without departing from the present innovative concept.

With further continued reference to FIGS. 1A, 1B, 2A, 2B, 2C, and 2D, the peripheral frame portion 30 includes mating structures in the form or projections 34 and alignment recesses 36 formed thereon. Optionally, the shape of the projections 34 and alignment recesses 36 can be configured to allow ultrasonically welding the two halves together to make a subassembly. An ultrasonic weld or snap feature can make the subassembly shoed as shown in FIG. 6E. When each of the stacking frames 10*a*, 10*b* are connected together, the projections 34 on each of the respective stacking frames 10*a*, 10*b* are received within the alignment recesses 36 of the respective other of the stacking frames 10*a*, 10*b*. That is to say, the projections 34 of the first stacking frame 10*a* are received within the alignment recesses 36 of the second stacking frame 10. Conversely, the projections 34 of the second stacking frame 10*a* are received within the alignment recesses 36 of the first stacking frame 10.

Figure 1A:
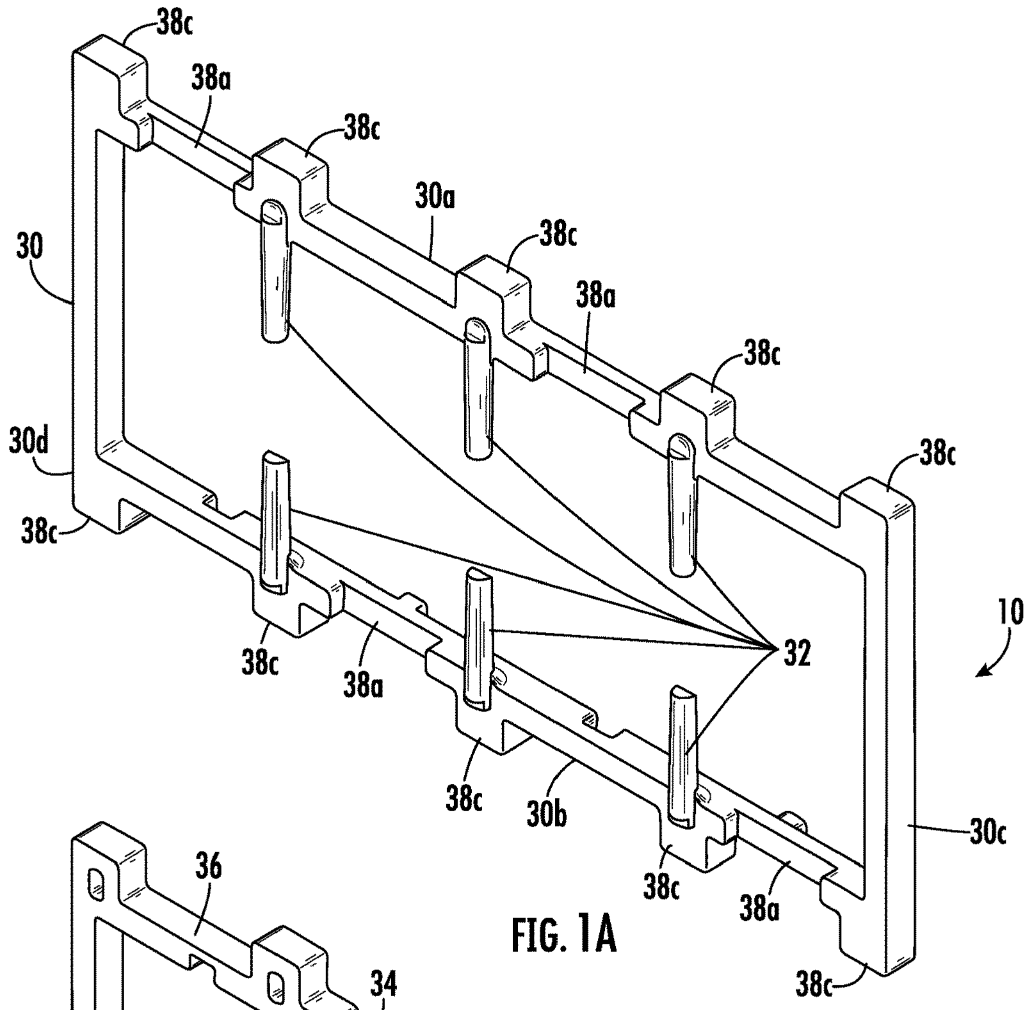
Figure 1B:
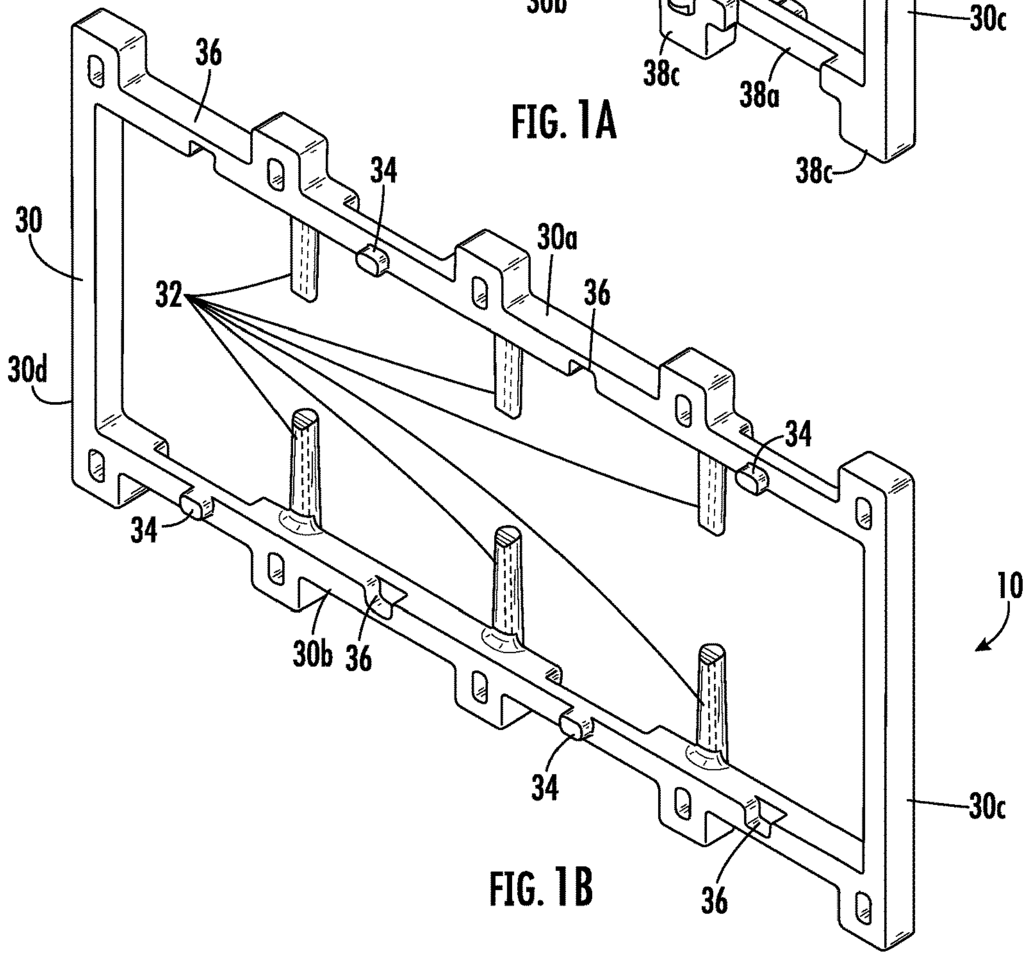
Figure 2A:
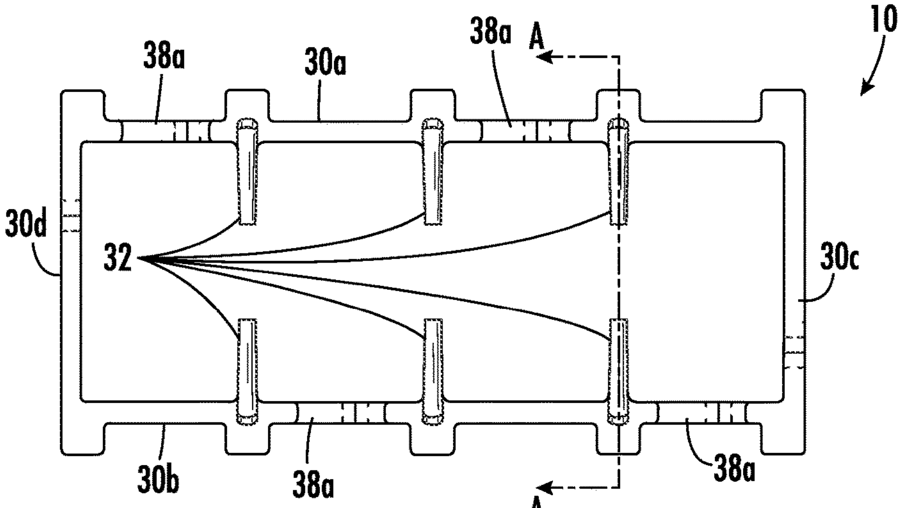
Figure 2B:
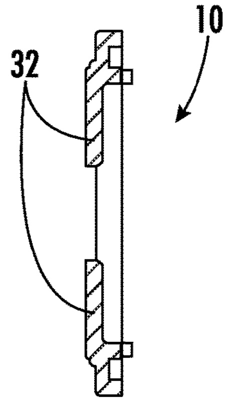
Figure 2C:
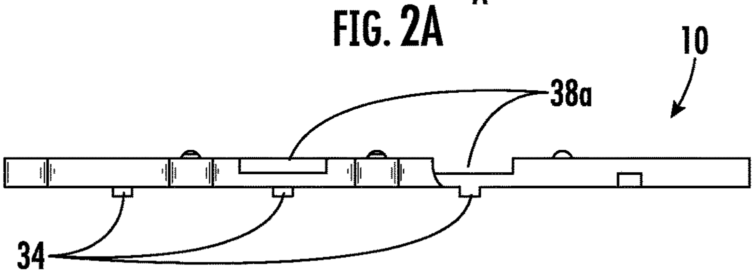
Figure 2D:
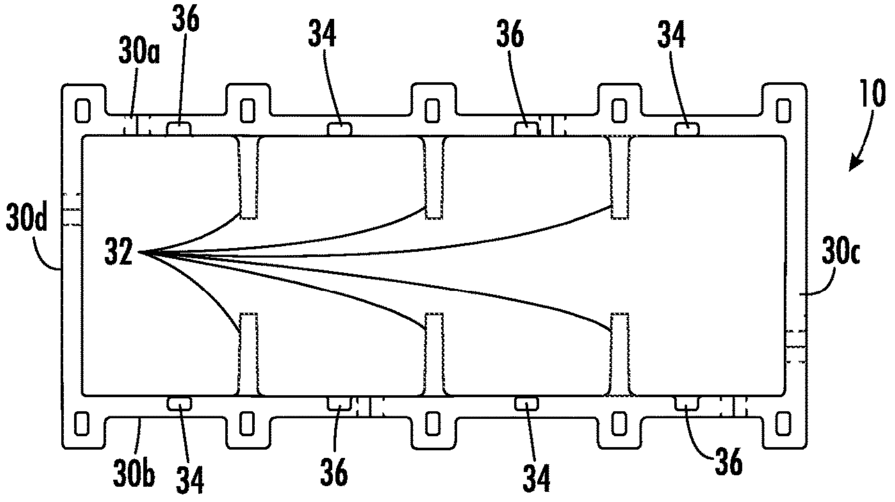

As shown in FIGS. 1A and 1B, the projections 34 and alignment recesses 36 are formed alternately along each of the first and second frame members 10*a*, 10*b* and staggered so that the projections 34 are pre-aligned to mate with the alignment recesses 36. Thus, the projections 34 and the alignment recesses 36 are formed on the same surface of each of the stacking frames 10*a*, 10*b*, which is to say, the same respective surfaces of each of the first and second frame members 30*a*, 30*b*. The stacking frames 10*a*, 10*b* include notches 38*a* formed along an opposite side of each of the frame members 30*a*, 30*b* to direct hot effluent from a thermal event in a cell toward the ends of the cells. (See also FIG. 3.)

Figure 3:
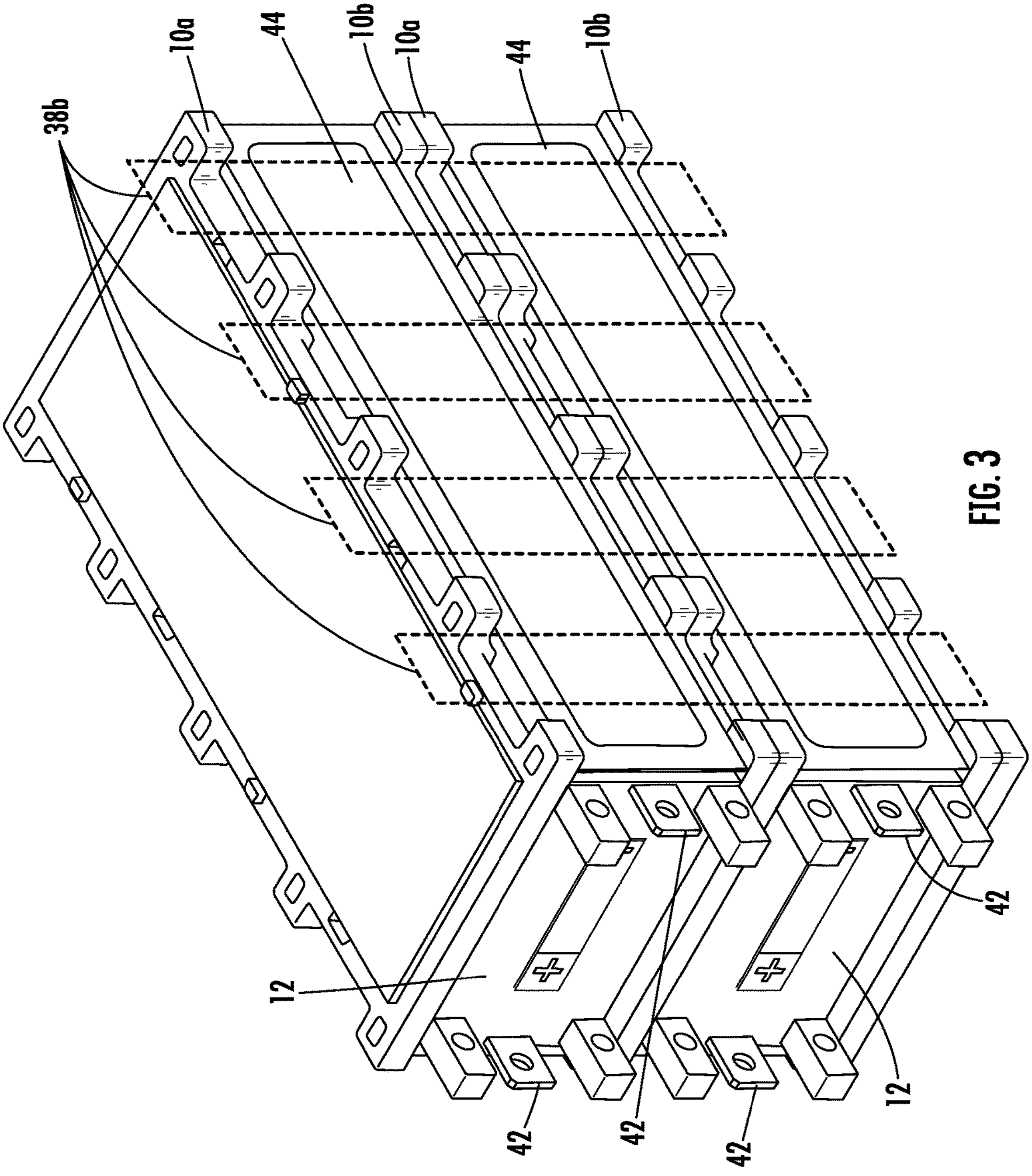
FIG. 3 is a perspective view of the present stacking frames deployed with a stack of two battery modules in accordance with an exemplary embodiment.

As also shown in FIG. 3, the hot effluent can then escape via "chimneys" 38*b* (shown in phantom) which are vertical channels defined by voids between protruding spacing features 38*c* formed along an outer perimeter of the stacking frames 10*a*, 10*b*. As shown in FIG. 7, a retention feature 38*d* can optionally be added to the end of the spacing features 38*c* that would help guide and retain the IRS end pouches 44. The retention feature 38*d* also operates as a lead in feature to make it easier to insert the TRS end pouches 44 in the middle of the stacks. The chimneys 38*b* direct the hot effluent and heated water vapor up toward a vent located on the top of the assembled battery pack. The chimneys 38*b* allow pressure to be released and enables hot gasses to escape to ensure that surrounding battery cells remain cool after a thermal runaway condition is quenched. As depicted, there are 8 chimneys per module, 2 on each side of the module. However, the present design can be adapted to include any desired number of chimneys without departing from the invention. It is to be appreciated that the chimneys 38*b* are features formed from the stacking frames 10*a*, 10*b* that are most particularly embodied in the assembled battery pack system composed of a stack of modules 12. In the preferred embodiment, the battery modules 12 assembled into chimneys 38*b* are assembled into a battery pack system of the same design and configuration as disclosed in the commonly assigned, co-pending patent application Ser. No. 17/933,976 entitled BATTERY PACK SYSTEM AND METHOD FOR MITIGATING AND RESPONDING TO THERMAL RUNAWAY, the entirety of the disclosure of which is hereby incorporated by reference.

Figure 4B:
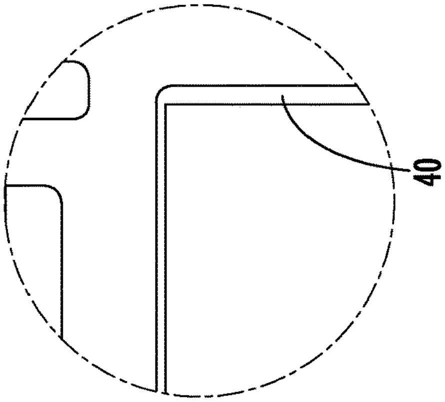
Figure 4A:
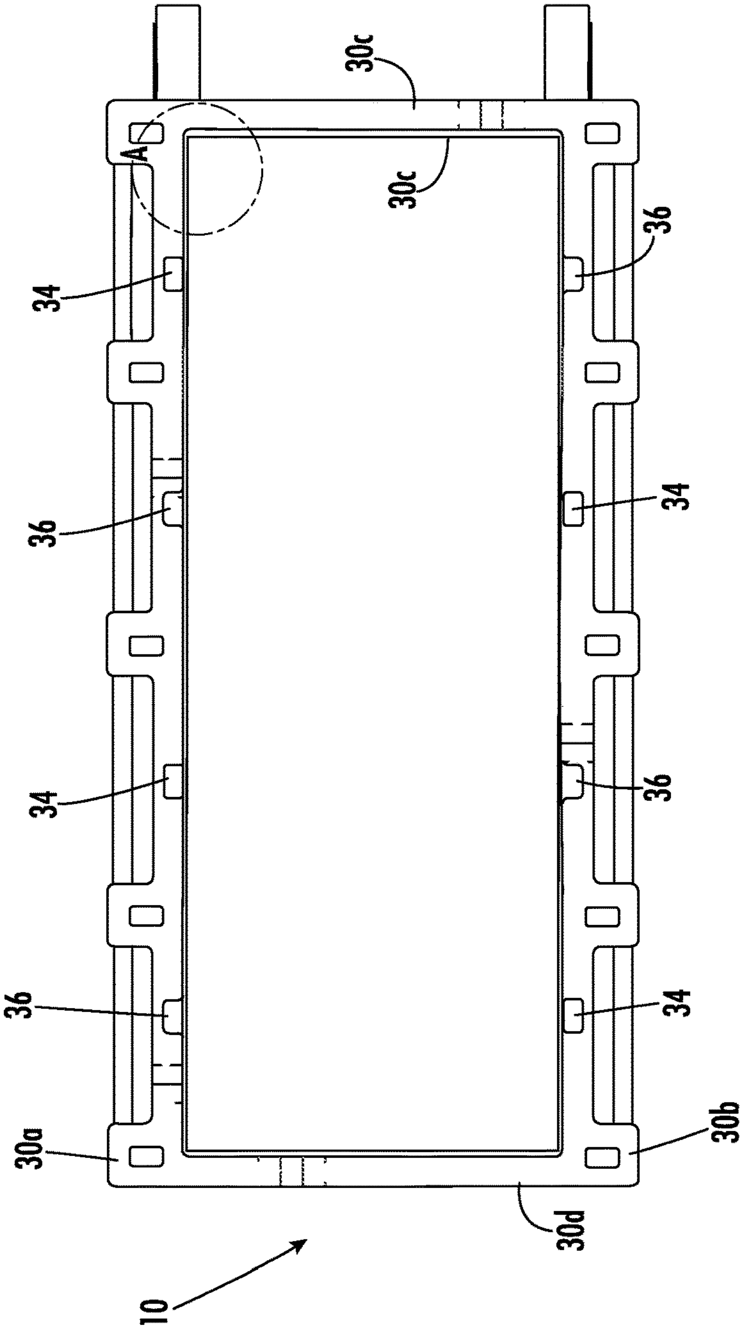

As shown generally in FIG. 4A and specifically in the detail view of FIG. 4B, the basic stacking frame design 10 of each of the first and second stacking frames 10*a*, 10*b* include a peripheral groove 40 for substantially surrounding and enclosing the perimeter of the surface of the battery module 12. The peripheral groove 40 is essentially a continuous notch encompassing the inner periphery of the stacking frame 10, and thereby mates with the peripheral edge of the top or bottom surface of the battery module 12 so that the stacking frame 10 can alternately support the battery module 12 or be supported by the battery module 12.

As shown in FIGS. 3, 5A, 5B, and 5C, the peripheral groove 40 of the first stacking frame 10*a* substantially surrounds and encloses the perimeter of the top surface of the battery module 12 upon which the first stacking frame 10*a*, rests. When the first stacking frame 10*a* is assembled in a mating fashion with the second stacking frame 10*b*, the peripheral groove of the second stacking frame 10*b* substantially surrounds and encloses a perimeter of a bottom surface of a second battery module 12 which is stacked upon the second stacking frame 10*b*. In this manner, the stacking frame assemblies can be used to create a stacked configuration of multiple battery modules 12. While two battery modules 12 are shown in the figures as defining a first stack and a second stack, this stacking configuration can be extended indefinitely as would be understood by those having skill in the art.

As also shown in FIGS. 3, 5A, 5B, and 5C, each of the battery modules 12 can include electrical connections 42 between the batteries contained in each module 12 and an external electrical system. The first and second stacks can each also include a TRS end pouch 44 that can connect the respective first and second stacking frames 10*a*, 10*b* of adjoining stacks that define a first stacking frame assembly for the first stack and a second stacking frame assembly for the second stack. For example, a TRS end pouch 44 can span from the second stacking frame of the first stacking frame assembly to the first stacking frame of the second stacking frame assembly. The TRS end pouch 44 spans a vertical side of the second battery module 12 to substantially enclose the side. There can be two end pouches 44 to span the opposite vertical sides of each respective battery module 12, to thereby provide containment for each module 12.

Figure 6D:
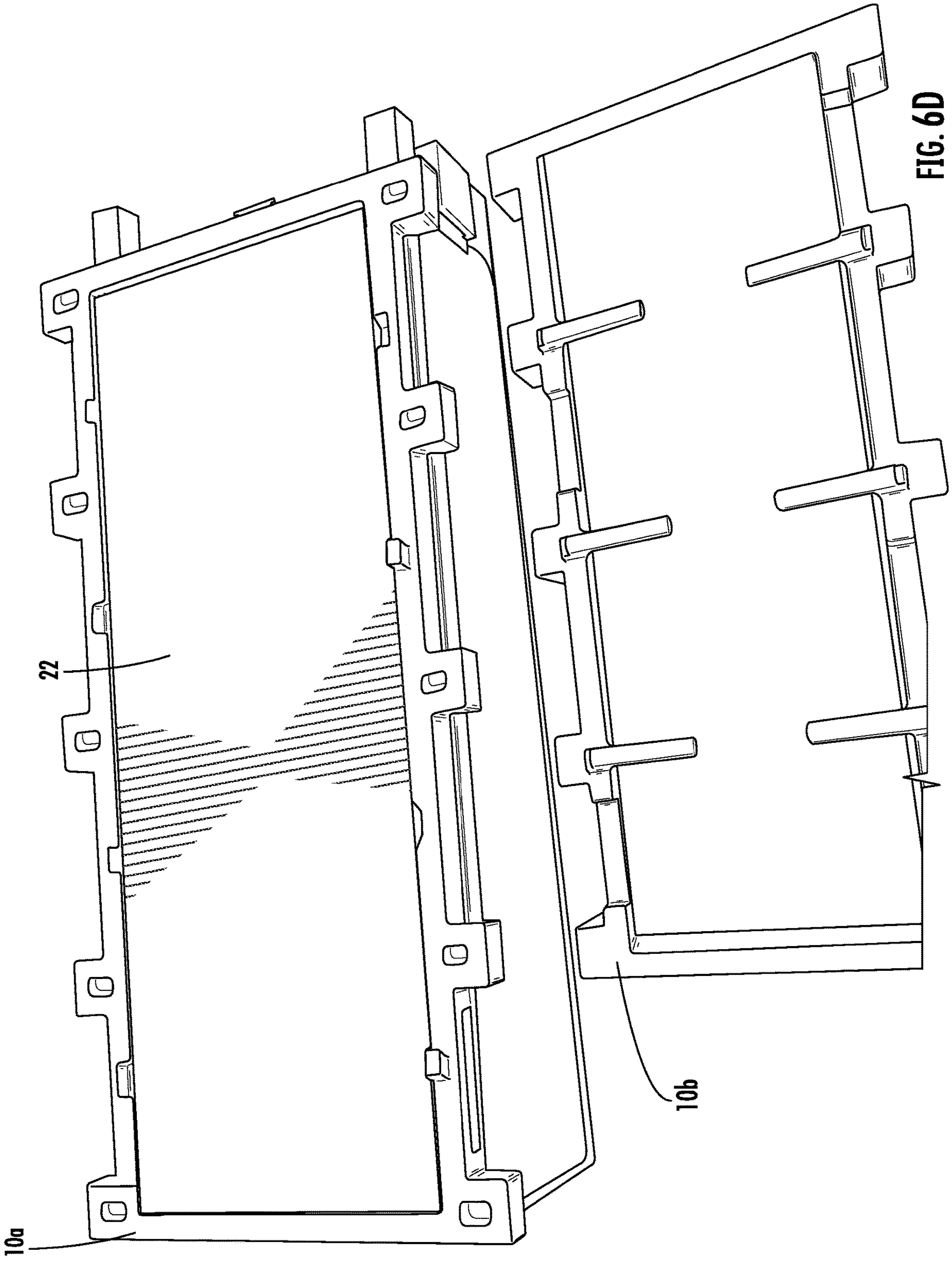
Figure 6E:
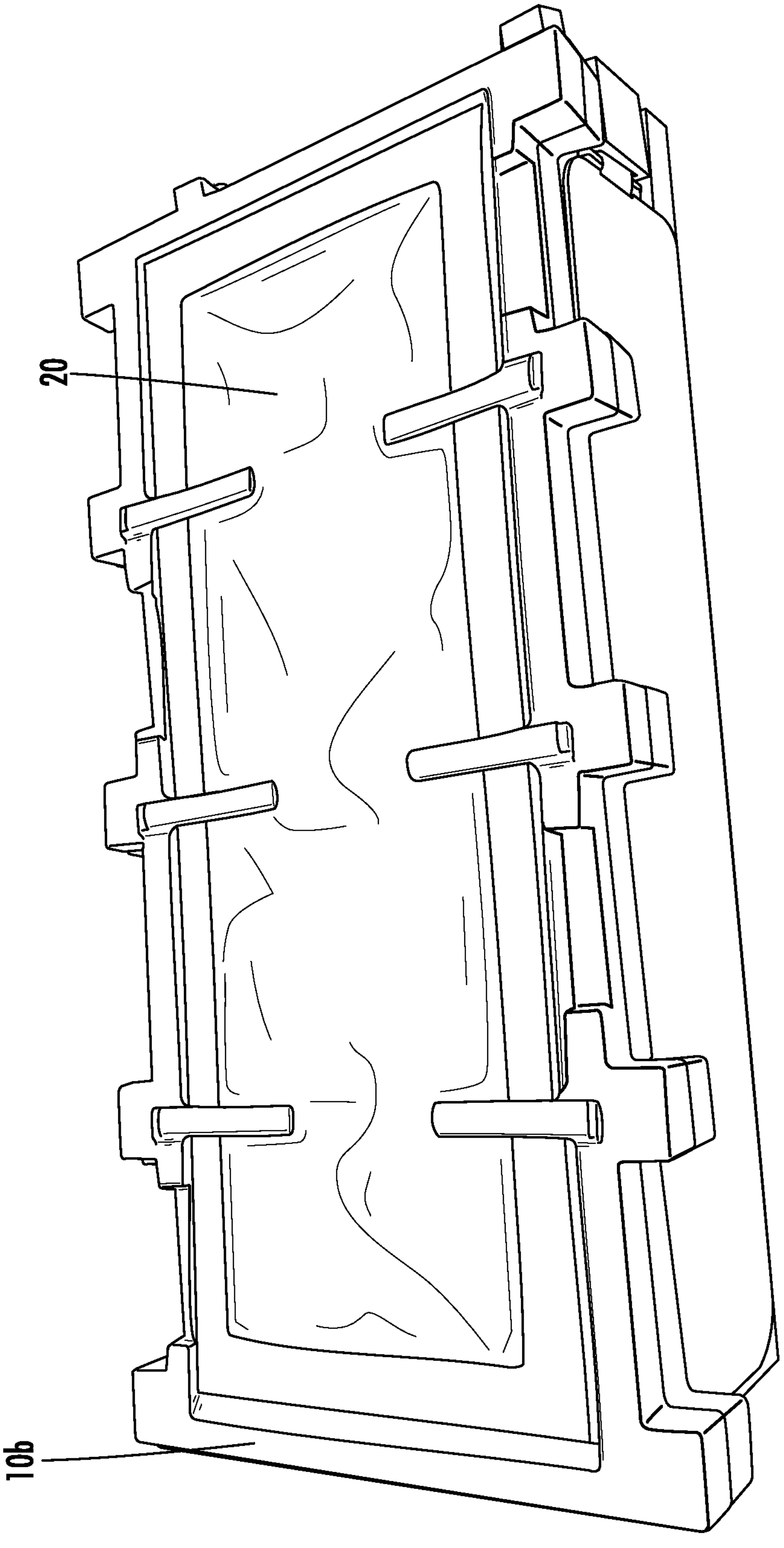

FIGS. 6A, 6B, 6C, 6I), and 6E show the various stages of assembly of the present configuration. FIG. 6A shows the battery module 12 with batteries 14 separate from an assembled stacking frame assembly formed of first and second stacking frames 10*a*, 10*b* with a TRS side pouch 20 visible and a second TRS pouch and spacer plate not visible. FIG. 6B shows the battery module 12 with batteries 14 assembled with a first stacking frame 10*a* with the remaining components unassembled, the second stacking frame 10*b*, two TRS side pouches 20 and the spacer plate 22. FIG. 6C is similar to FIG. 6B but with a first TRS side pouch 20 added to the first stacking frame 10*a* atop the battery module 12 with the remaining components unassembled, the second stacking frame 10*b*, the remaining TRS pouch 20 and the spacer plate 22. FIG. 6D is similar to FIG. 6C but with the spacer plate 22 atop the first TRS pouch and the remaining components unassembled, the second stacking frame 10*b* and the second remaining TRS pouch (not shown). FIG. 6E shows the fully assembled stack with the second TRS side pouch 20 added with the second stacking frame 10*b*.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:

What is claimed:

1. A passive internal cooling system for a battery pack, comprising:

first and second stacking frames, each having mating structures for engaging and retaining the first and second stacking frames to each other, wherein each of the first and second stacking frames are being configured for substantially surrounding and enclosing a surface of a battery module for retaining at least one battery, wherein each of the first and second stacking frames comprises a peripheral frame portion positioned on a perimeter of the surface of the battery module;

at least one thermal runaway shield (TRS) pouch, enclosed between the first and second stacking frames, the at least one TRS pouch including a thermally cooling fluid that ruptures into the battery module from heat produced in a thermal runaway event in the battery module; and a plurality of pins extending inwardly toward a center of the peripheral frame portion, wherein the plurality of pins engages and retains the at least one TRS pouch between the first and second stacking frames.

2. The cooling system of claim 1, wherein the at least one TRS pouch comprises first and second TRS pouches with a spacer plate inserted therebetween, wherein the spacer plate provides a thermal barrier between the first and second TRS pouches during the thermal runaway event in the battery module.

3. The cooling system of claim 1, wherein the mating structures comprise projections and alignment recesses formed on each of the stacking frames, wherein the projections on each of the stacking frames are received within the alignment recesses of the respective other of the stacking frames.

4. The cooling system of claim 3, wherein the projections and alignment recesses are formed on the same surface of each of the stacking frames.

5. The cooling system of claim 1, wherein each of the first and second stacking frames comprise at least one peripheral groove for substantially surrounding and enclosing a perimeter of the surface of the battery module.

6. The cooling system of claim 5, wherein the peripheral groove of the first stacking frame substantially surrounds and encloses a perimeter of a top surface of the battery module upon which the stacking frame rests, wherein the peripheral groove of the second stacking frame substantially surrounds and ecloses a perimeter of a bottom surface of a second battery module stacked upon the second stacking frame.

7. The cooling system of claim 1, wherein the battery module comprises electrical connections between the at least one battery and an external electrical system.

8. A passive internal cooling system for a battery pack, comprising:

first and second stacking frames, each having mating structures for engaging and retaining the first and second stacking frames to each other, wherein each of the first and second stacking frames comprises a peripheral frame portion that sits atop a perimeter of a battery module for retaining at least one battery, for substantially surrounding and enclosing a surface of the battery module;

first and second TRS pouches, enclosed between the first and second stacking frames, the at least one TRS pouch including a thermally cooling fluid that ruptures into the battery module from heat produced in a thermal runaway event in the battery module; and a spacer plate inserted between the first and second TRS pouches, wherein the spacer plate provides a thermal barrier between the first and second TRS pouches during the thermal runaway event in the battery module;

wherein the peripheral frame portions of each of the first and second stacking frames further comprise a plurality of pins extending inwardly toward a center of the peripheral frame portion, wherein the plurality of pins engages and retains the first and second TRS pouches between the first and second stacking frames.

9. The cooling system of claim 8, wherein the mating structures comprise projections and alignment recesses formed on each of the stacking frames, wherein the projections on each of the stacking frames are received within the alignment recesses of the respective other of the stacking frames.

10. The cooling system of claim 9, wherein the projections and alignment recesses are formed on the same surface of each of the stacking frames.

11. The cooling system of claim 8, wherein each of the first and second stacking frames comprise at least one peripheral groove for substantially surrounding and enclosing a perimeter of the surface of the battery module.

12. The cooling system of claim 11, wherein the peripheral groove of the first stacking frame substantially surrounds and encloses a perimeter of a top surface of the battely module upon which the stacking frame rests, wherein the peripheral groove of the second stacking frame substantially surrounds and encloses a perimeter of a bottom surface of a second battery module stacked upon the second stacking frame.

13. The cooling system of claim 8, wherein the battery module comprises electrical connections between the at least one battery and an external electrical system.

* * * * *